United States Patent Office 3,581,389
Patented June 1, 1971

3,581,389
FABRICATION OF MAGNETIC CORES FOR ELECTRIC ROTATING MACHINES HAVING AXIALLY-SPACED AIR GAPS
Tetsuro Mori, Kazuo Karino, and Nobuo Matsui, Kitakyushu-shi, Japan, assignors to Kabushiki Kaisha Yaskawa Denki Seisakusho, Oaza-Fujita, Yahata-ku, Kitakyushu-shi, Fukuoka-ken, Japan
Filed Sept. 18, 1968, Ser. No. 760,651
Int. Cl. H02k 15/02
U.S. Cl. 29—598                                    7 Claims

ABSTRACT OF THE DISCLOSURE

The side slots of a wound type magnetic core for an electric rotating machine having an axially spaced gap are made radially rectilinear by first punching, in the strip to be wound into the core, slot openings or cutout notches of a number less than, equal to, or greater than the number corresponding to the required number of slots, and after completion of the core winding, the winding turns of the core are decreased or increased to obtain the required number of slots.

BACKGROUND OF THE INVENTION

This invention relates a method for producing a magnetic core for an electric rotating machine which has an axially spaced air grap as in the case of the disc type rotating machine.

Such a machine ordinarily has a wound magnetic core of doughnut shape, at least one side of which is provided with a plurality of radially or obliquely extending grooves or slots. In the case where these slots are cut by machining after completion of winding of the core from a belt-shaped steel strip, the machining operation requires an excessive amount of labor. On the other hand, when slot openings are punched in the strip in the course of its winding, the slot openings tend to be misaligned into slots of spiral configuration as indicated in FIG. 3 for the reasons hereinafter disclosed, and if it is desired to avoid this difficulty, a special device for successively displacing the winding position of the steel strip in accordance with the constantly increasing radius of the wound core must be combined with the winding device.

SUMMARY OF THE INVENTION

Therefore, the main object of the present invention is to overcome the above described difficulties experienced in the conventional method of producing a magnetic core for an electric rotating machine having an axially-spaced air gap.

With this object in view, the present invention provides a novel method for producing the magnetic core comprising the steps of winding a belt-shaped steel strip into the magnetic core, simultaneously punching a series of slot openings in the strip correlatedly with the winding of the steel strip, and correcting thereafter the slot number and the arrangement thereof so that a required number of rectilinearly arranged slots are obtained, wherein the correction is performed in a manner such that a number of the slot openings which is less than, equal to, or greater than the required number of slot openings corresponding to the desired slot number is first punched in the punching step, and in the latter two cases winding the strip so that a suitable gap is provided between adjacent layers of the strip in the winding step, and the core strip is thereafter unwound for the first case starting from the outer layers, or wound or unwound for the latter two cases from the inner layers.

The nature of invention will now be made more apparent from the following detailed description with respect to preferred embodiments thereof when read with reference to the accompanying drawings.

DETAILED DESCRIPTION

Figure 1:
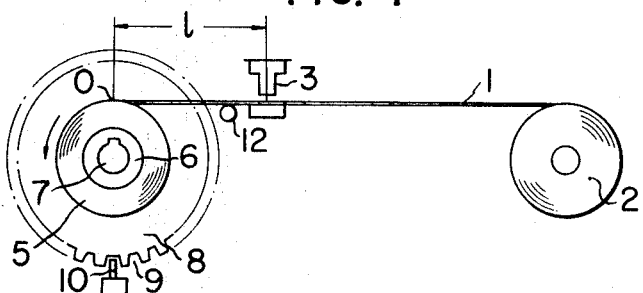
FIG. 1 is a schematic diagram of a punching-and-coiling device for explaining the principle of the present invention.
Figure 2:
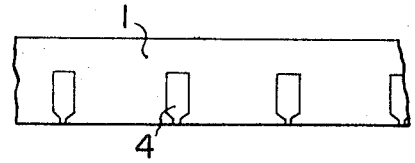
FIG. 2 is a partial plan view of the belt-shaped steel strip whereon a series of slot openings are punched out.

Referring first to FIGS. 1 through 4, the punching-and-coiling device shown in FIG. 1 comprises essentially a supply reel 2 for supplying a belt-shaped steel strip 1, a slot punching device 3 for punching a series of slot openings 4 in the strip 1, a winding drum 6 mounted on a winding shaft 7 for winding the punched strip 1 in the arrow direction to form a wound magnetic core 5, an indexing plate 8 having a series of notches 9 around its periphery, and a detent 10 engaging one of the indexing notches 9.

The detent 10 is operated once with respect to every one or a certain number of notches 9 during the rotation of the indexing plate 8 by an operating device 11 and thereby permits rotation of the winding drum 6 through a predetermined angle. The mechanism employed for this operation may be any of well-known types, and the components related thereto may be so arranged that the punching operation of the device 3 is carried out each time the detent 10 engages one of the notches 9. Numeral 12 designates a guide roller. Numeral 13 in FIG. 3 and 13a in FIG. 4 designate the slots obtained by winding of the steel strip 1 and the slots corrected thereafter, respectively.

The belt-shaped magnetic core plate (steel strip) 1 supplied from the reel 2 with slot openings 4 punched thereon by the punching device 3 is thereafter wound on the winding drum 6 to form the magnetic core 5 of the electric rotating machine. The belt-shaped steel strip 1 in this case is subjected to a tensile force by suitable means not shown in the drawing, and the spacing intervals between adjacent punched openings on the steel strip 1 are determined by the rotated angle of the winding drum 6 which is rotated corresponding to the time of engagement between the detent 10 and the notches 9 of the indexing plate 8 and also by the radius of the magnetic core 5 being wound on the drum 6 at the time, the intervals of the slot openings thus being enlarged along with the increase of the radius of the magnetic core.

However, the punching operation of the device 3 is carried out to coincide with a winding position designated by O, whereas the actual punched position on the strip is not at the position O but at a position apart from the position O by a distance *l*. For this reason, the punched slot openings deviate from their correct positions by an angle corresponding to an arc length equivalent to the distance *l*, and a spiral configuration of the slot arrangement as described before and indicated in FIG. 3 is obtained.

According to the present invention, the number of the notches of the index plate 8 is so determined that it is less than, or greater than, or even equal to the required number of the slots. As a result, the resultant magnetic core 5 obtained after the completion of the punching and winding has a number of spiral formed slots 13 which is different from the required number thereof.

The thus obtained magnetic core 5 is released from the winding shaft 7 together with the winding drum 6, and in the case where the number of the slots is less than the required number of the slots, for instance, by unity, the core assembly 5 and drum 6 are inserted into a correction frame 14. The clamping nut 15 of the frame 14 is then released until the number of the grooves appearing at the outside periphery of the magnetic core is thereby increased by unity. For this purpose, if necessary, the magnetic core 5 is unwound, starting from the outer layer to inner layer by utilizing the repulsive force stored at the time of winding, or by positively exerting a torque to unwind the drum 6 in the reverse direction, so that the number of the slots is brought to the required number N and that the arrangement of the slots is corrected to the desired radial and rectilinear disposition as indicated by the numeral 13a in FIG. 4. It should be noted that the above described releasing of the correcting frame 14 can be carried out not only by releasing the nut 15 as described above but also by the utilization of hydraulic pressure or the like.

Figure 3:
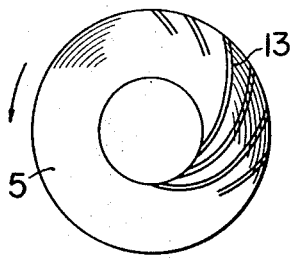
FIG. 3 is an axial view of a magnetic core punched out and coiled by means of the punching-and-coiling device shown in FIG. 1, the thus obtained slots being misaligned into a spiral configuration.
Figure 4:
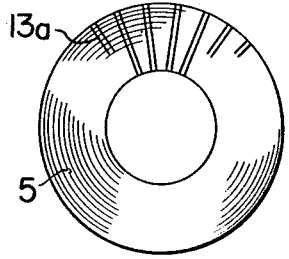
FIG. 4 is an axial view of a magnetic core similar to that shown in FIG. 3 except that the slot arrangement has been corrected into radial alignment.
Figure 6:
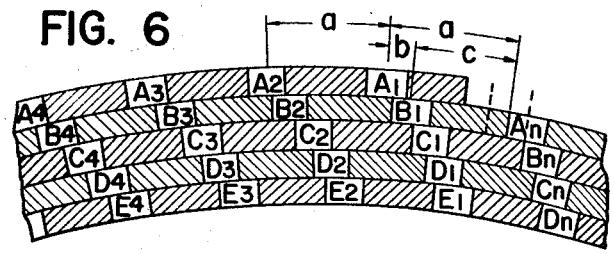
FIGS. 6 and 7 are enlarged fragmentary views showing one part of the magnetic core for explaining the principle of the correcting method which constitutes the principal feature of the present invention.

FIG. 6 is an explanatory diagram which illustrates one part of the magnetic core 5 shown in FIG. 3 on a much enlarged scale. In the drawing, A1, A2, A3, . . . , A*n* indicate punched out slot openings in the outermost layer of the magnetic core plate for the convenience of the explanation, the numbers suffixed are assigned in the reverse order to that wherewith the steel strip is actually punched out), and as is seen from the drawing, the number of the punched out portions is less than the required number of the slots by unity. B1, B2, B3, . . . . B*n* designate the punched-out slot openings in the second layer of the magnetic core plate, and their positions deviate from those of the above described positions of A1, A2, A3, . . . , A*n* rightwardly by a distance *b*. Likewise, C1, C2, C3, . . ., C*n*; D1, D2, . . ., D*n*; and E1, E2, . . ., E*n* are the punched-out slot openings on the third, fourth, and fifth layers, respectively.

When the nut 15 of the correction frame 14 is released, and the number of the slot openings in the outermost layer is increased by unity, the opening B1 is brought to the first layer at a position apart from the punched-out slot opening A1 by a predetermined distance *a* as shown by the dotted lines. The distance by which the punched slot openings B1, B2, . . . are shifted rightwardly corresponds to a length *c*, which is equal to the difference between the slot interval *a* in the first layer and the above described rightwardly deviated distance *b*, and for this reason, the punched-out slot openings B2, B3, . . . are all shifted rightwardly by a distance corresponding to *c* and they are aligned with the openings A1, A2, . . ., A*n*.

Figure 7:
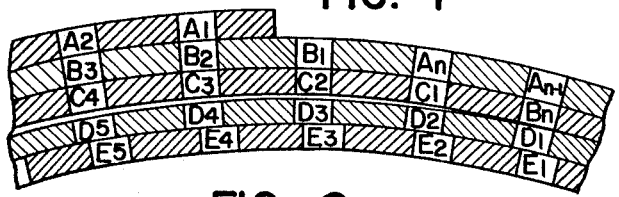

Because the punched-out slot opening E1 is brought to the first layer, the number of the slot openings in the second layer B2, B3, . . . B*n* is made less than the required slot number by two, therefor the punched-out slot openings C1 and C2 in third layer are brought up to the second layer so that they are aligned with A*n* and B1 as described above with respect to B1. As a result, the punched-out slot openings C3, . . ., C*n* align with the openings B2, B3, . . ., B*n*, and the number of the slot openings in the third layer is decreased to a number less than the required slot number by three, and the openings D1, D2, D3 in the fourth layer are brought up to the third layer. The thus corrected positions of the slot openings are shown in FIG. 7. It should be noted that the resultant number of the slot openings 13a is increased over that of the openings 13 by unity, whereby the magnetic core is provided with the required number of slot openings arranged along the radii in rectilinear configuration.

Figure 5:
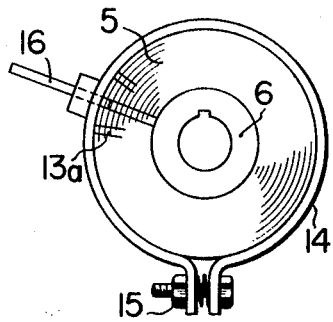
FIG. 5 is an axial view of an example of a correcting device employed in correcting the slot arrangement in accordance with the present invention.

If it is desired, the slot openings are further corrected by the use of a slot gage 16 (see FIG. 5) whereupon suitable portions of the core plates may be fixed together, for instance, by welding or by any suitable adhesive agent, and the thus completed magnetic core may be removed from the correcting frame 14 and the winding drum 6.

Figure 8:
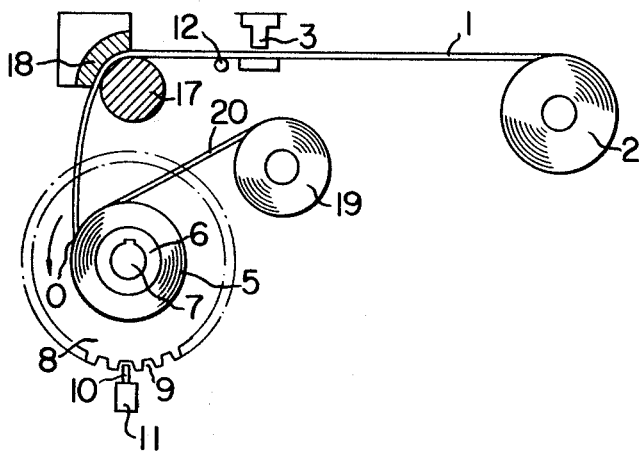
FIG. 8 is a schematic diagram similar to FIG. 1, illustrating another punching-and-coiling device suitable for use in the present invention.

Referring to FIG. 8, there is illustrated another embodiment of the punching-and-coiling device suitable for use in the present invention, in which the same or similar part is indicated by the same reference number as in FIG. 1. In this example, the number of the notches 9 provided on the index plate 8 is so determined that the number of slots thereby obtained on the magnetic core is equal to the required number N of the slots, or more or less than the required number N of the slots by, for instance, unity, and the belt-shaped steel strip 1, along the length of which a series of slot openings 4 have been punched out by means of the punching device 3, is suitably bent through a shaping device 18 consisting of, for instance, a hard rubber at the time the steel strip 1 passes over a correcting roller 17, and coiled around the winding drum 6 so that the strip 1 is interleaved by a tape 20 furnished from a reel 19. The thickness of the tape 20 is determined by the thickness of the steel strip 1, the number of turns thereof for obtaining the magnetic core, required slot number, and so on, and is ordinarily selected to be in a range of from 0.03 to 0.2 mm. The width of the tape 20 may be selected arbitrarily, and the tape 20 may consist of, for instance, stainless steel. When the number of the slots obtained after winding is different from the required slot number N, and this difference is more than the unity, the thickness of the tape 20 should be increased to a larger value.

The magnetic core 5 thus obtained has spirally curved slots as indicated in FIG. 3. For correction of this slot misalignment, the magnetic core 5 is removed from the winding shaft 7 and inserted into the correcting frame 14, and then the tape 20 is extracted from the magnetic core 5. As a result, gaps are created between adjacent winding turns of the core strip corresponding to the thickness of the extracted tape 20, and the slot misalignment can be corrected by further winding the magnetic core starting from the inside layers in the same direction as that of the initial winding until the required slot number N is obtained.

Such a correcting operation in which the core strip is wound from the inside layers cannot be attempted if the core strip has been tightly wound at its initial winding stage, and the aligment of the slot openings by this procedure is rendered impracticable. More particularly, when the core strip is wound from its inside layers for the purpose of decreasing the slot number by unity, one slot opening which is now is excess is shifted to the second layer counted from inside, the two slot openings now in excess in the second layer are then shifted to the third layer, and so on, thus the number of the slot openings shifted to the next outer layer being constantly increased. However, because of the smaller intervals between the punched openings on the inner layers, the circumferential length of a particular layer determined as the total sum of such intervals becomes too short, and further winding of these layers for obtaining linear alignment of the slot openings is thereby rendered impossible.

Otherwise, when the slot number of the punched and wound magnetic core is made equal to the required slot number at its initial stage without providing any slack between each of the wound layers, the correction of the slots by further winding from the inside layers is also made difficult because of the ever decreasing value of *b* in the inward layers of the strip.

With the aforementioned second embodiment of the present invention as shown in FIG. 8, gaps are obtained between the individual layers of the magnetic core after the tape 20 is removed from the interleaving positions, and as a result, the above described insufficient circumferential length of the inner layer can be compensated for by the excessive circumferential length of the outer layer caused by the inter-leaving of the tape 20, whereby the correction of the slot number and the slot configuration can be undertaken by additional winding of the core strips starting from the inside layers.

Alternatively, in the case where the gaps of sufficient amount are provided between the individual layers of the magnetic core, the magnetic core may be initially provided with a slot number less than the required slot number, and then the slot correction may be carried out by unwinding the core starting from the inner layers.

While, in the embodiment of the invention shown in FIG. 8, a tape is utilized between adjacent layers of the wound magnetic core so that gaps may be obtained therebetween, it is also possible to provide means whereby the tension force applied on the core strip at the time of its being wound into the magnetic core can be made adjustable so that a suitable gap may be obtained between adjacent wound layers without requiring any insertion of tape.

In either of the above-described embodiments of the present invention, a part of the steel strip starting from the forward end thereof to the point where the steel strip is punched for the first time by the punching device 3 and having a length of approximately equal to $l$ is not punched with the slot openings, and this part may be removed, for instance, by cutting it out in the course of its being wound into the magnetic core, or thereafter, or even at the initial stage, wherein the steel strip may be temporarily connected with another thin plate and wound into the magnetic core.

In the above description, although the slot openings have been punched and wound into the magnetic core which has a slot number different from the required slot number by unity, the difference may be increased to a number greater than unity if the slack gaps between the layers in the magnetic core are of a sufficient amount. The difference may be, for instance, increased to 4 although this figure might be varied by the thickness of the steel strip, required number of slots, and other conditions. Moreover, the difference is not necessarily an integer but may be a fractional number, so that the initial slot number is different from the required slot number N, for instance, by 1.5.

Figure 9:
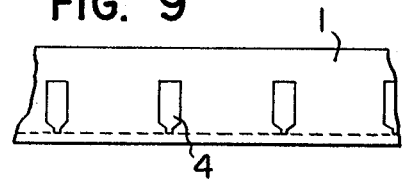
FIGS. 9 and 10 are views similar to FIG. 2, showing further examples of the slot opening configurations.
Figure 10:
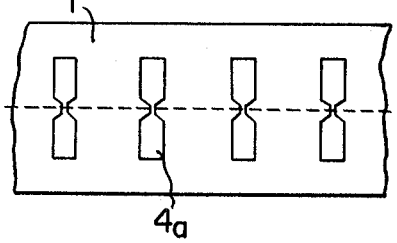

Furthermore, because it is difficult for the tooth portion between the punched slot openings to be bent when the punched steel strip is wound into the magnetic core, it was found to be advantageous to provide the steel strip beforehand with a suitable bend as shown in FIG. 8. This difficulty in bending the tooth portion may be otherwise obviated by first punching a series of closed slot openings 4a having no communication to the outside along the side edge of the steel strip as shown in FIG. 9, and then removing the edge portion along the dotted line for obtaining communication to the outside in each of the slot openings. Likewise, the difficulty may be eliminated by punching the slot openings on the steel strip so that they are arranged as opposed and intercommunicating pairs as indicated in FIG. 10, and after the strip has been wound on the winding drum, the wound strip may be separated into two cores.

Althuogh the present invention has been disclosed with respect to its preferred embodiments, it will be apparent that various modifications and changes therein may be made without departing from the true spirit and scope of the present invention as defined in the appended claims.

We claim:

1. In the production of a magnetic core having a plurality of radially or obliquely extending side slots and used in an electric rotating machine of a type having an axially spaced air gap, the method comprising the steps of winding a belt-shaped steel strip into the magnetic core, simultaneously punching a series of slot opening correlatedly with the winding of the steel strip, each of said slots being formed by a combination of said slot openings respectively in successive layers of said strip in the magnetic core, and thereafter circumferentially shifting successive layers of said strip commencing from the outer layer to align said slot openings to form said side slots.

2. In the production of a magnetic core having a plurality of radially or obliquely extending side slots and used in an electric rotating machine of a type having an axially spaced air gap, the method comprising the steps of winding a belt-shaped steel strip into the magnetic core, simultaneously punching a series of slot openings correlatedly with the winding of the steel strip, each of said slots being formed by a combination of said slot openings respectively in successive layers of said strip in the magnetic core, and thereafter circumferentially shifting successive layers of said strip commencing from the inner layer to align said slot openings to form said side slots.

3. The method as defined in claim 1, further comprising the step of imparting a suitable curvature corresponding to the radius of the core at the time of winding, to each of the tooth-like portions between adjacent punched slot openings just after they are punched but before they are wound into the core.

4. The method as defined in claim 2, further comprising the step of imparting suitable curvature corresponding to the radius of the core at the time of winding, to each of the tooth-like portions between adjacent punched slot openings just after they are punched but before they are wound into the core.

5. The method as defined in claim 1, wherein a series of closed slot openings having no communication to the outside are first punched in said punching step on said steel strip, and after the strip is wound into the magnetic core, the surface portion of the magnetic core is removed to a predetermined depth so that the slot openings are exposed and opened on the surface of the magnetic core.

6. The method as defined in claim 2, wherein a series of closed slot openings having no communication to the outside are first punched out on said steel strip near its side edge, and after the strip is wound into the magnetic core, the surface portion of the magnetic core is removed to a predetermined depth so that the slot openings are exposed and opened on the surface of the magnetic core.

7. A method of forming a slotted magnetic core assembly for electrical rotating machines comprising the steps of advancing a continuous strip of material successively through a slot punching device to form a series of slot openings, thence winding said strip onto a winding device to form the magnetic core while actuating said devices in coordinated manner, thereafter circumferentially shifting successive layers of said strip to align said slot openings.

References Cited

UNITED STATES PATENTS

| | | | |
|---|---|---|---|
| 2,123,350 | 7/1938 | Anderson | 242—56.8 |
| 2,357,017 | 8/1944 | Miller et al. | 242—56.8 |
| 2,417,818 | 3/1947 | Finn | 242—128 |
| 3,019,998 | 2/1962 | Jaun | 242—56.8 |

JOHN F. CAMPBELL, Primary Examiner

C. E. HALL, Assistant Examiner

U.S. Cl. X.R.

29—605, 609; 72—132, 147, 148; 242—56.8, 128; 310—268